US007631068B1

(12) United States Patent
Martins (10) Patent No.: US 7,631,068 B1
(45) Date of Patent: Dec. 8, 2009

(54) TOPOLOGY FOR SHOWING DATA PROTECTION ACTIVITY

(75) Inventor: Rodney J. Martins, Maple Grove, MN (US)

(73) Assignee: Symantec Operating Corporation, Mountain View, CA (US)

( * ) Notice: Subject to any disclaimer, the term of this patent is extended or adjusted under 35 U.S.C. 154(b) by 791 days.

(21) Appl. No.: 10/413,164

(22) Filed: Apr. 14, 2003

(51) Int. Cl.
*G06F 15/16* (2006.01)
*G06F 15/173* (2006.01)
*G06F 15/177* (2006.01)

(52) U.S. Cl. ............................. 709/224; 714/6; 714/45; 370/363; 370/392

(58) Field of Classification Search ......... 709/200–203, 709/208, 209, 217–228, 229–232, 239–244; 719/310–311; 345/594; 715/700, 711, 734, 715/735–740; 700/91; 711/162; 714/6, 714/45; 370/363, 392
See application file for complete search history.

(56) References Cited

U.S. PATENT DOCUMENTS

| | | | | |
|---|---|---|---|---|
| 5,958,012 | A | | 9/1999 | Battat et al. .................. 709/224 |
| 6,483,812 | B1 | * | 11/2002 | Prorock ....................... 370/252 |
| 6,574,663 | B1 | * | 6/2003 | Bakshi et al. ................ 709/223 |
| 6,601,187 | B1 | * | 7/2003 | Sicola et al. .................... 714/6 |
| 6,718,447 | B2 | * | 4/2004 | Cochran ...................... 711/162 |
| 7,082,465 | B1 | * | 7/2006 | Martin et al. ................ 709/224 |
| 7,206,836 | B2 | * | 4/2007 | Dinker et al. ................ 709/224 |
| 2003/0026254 | A1 | * | 2/2003 | Sim ............................. 370/392 |
| 2003/0130821 | A1 | * | 7/2003 | Anslow et al. .............. 702/186 |
| 2003/0161302 | A1 | * | 8/2003 | Zimmermann et al. ...... 370/363 |
| 2004/0059807 | A1 | * | 3/2004 | Klotz et al. .................. 709/223 |
| 2004/0153863 | A1 | * | 8/2004 | Klotz et al. .................... 714/45 |
| 2004/0155899 | A1 | * | 8/2004 | Conrad ........................ 345/736 |
| 2004/0221041 | A1 | * | 11/2004 | Tabbara ....................... 709/227 |
| 2006/0111880 | A1 | * | 5/2006 | Brown et al. .................... 703/1 |

OTHER PUBLICATIONS

"BrightStor™ Enterprise Backup—*Getting Started*", © 2001 Computer Associates International, Inc., pp. 1-1 through F-7 (printed on Jan. 18, 2002).

* cited by examiner

*Primary Examiner*—Haresh N Patel
(74) *Attorney, Agent, or Firm*—Campbell Stephenson LLP (57) ABSTRACT

Systems, methods, apparatus and software can provide visualization of the topology of a data protection system. Various devices making up the data protection system are displayed using graphical user interface elements such as icons. The display of the devices making up the data protection system illustrates the topology of the data protection system, connections among various system devices, device status information, device activity information, and/or device configuration information.

12 Claims, 5 Drawing Sheets

TOPOLOGY FOR SHOWING DATA PROTECTION ACTIVITY

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF THE INVENTION

The present invention relates to data protection in a networked or client/server computing environment, and particularly to systems and methods for displaying a data protection system topology and managing the same.

BACKGROUND OF THE INVENTION

The ever increasing reliance on information and the computing systems that produce, process, distribute, and maintain such information in its myriad forms continues to put great demands on techniques for data protection. Simple systems providing periodic backups of a computer system's data have given way to more complex and sophisticated data protection schemes that take into consideration a variety of factors including: the wide variety of computing devices and platforms encountered, numerous different types of data that must be protected, the speed with which data protection operations must be executed, and the flexibility demanded by today's users.

Figure 1:
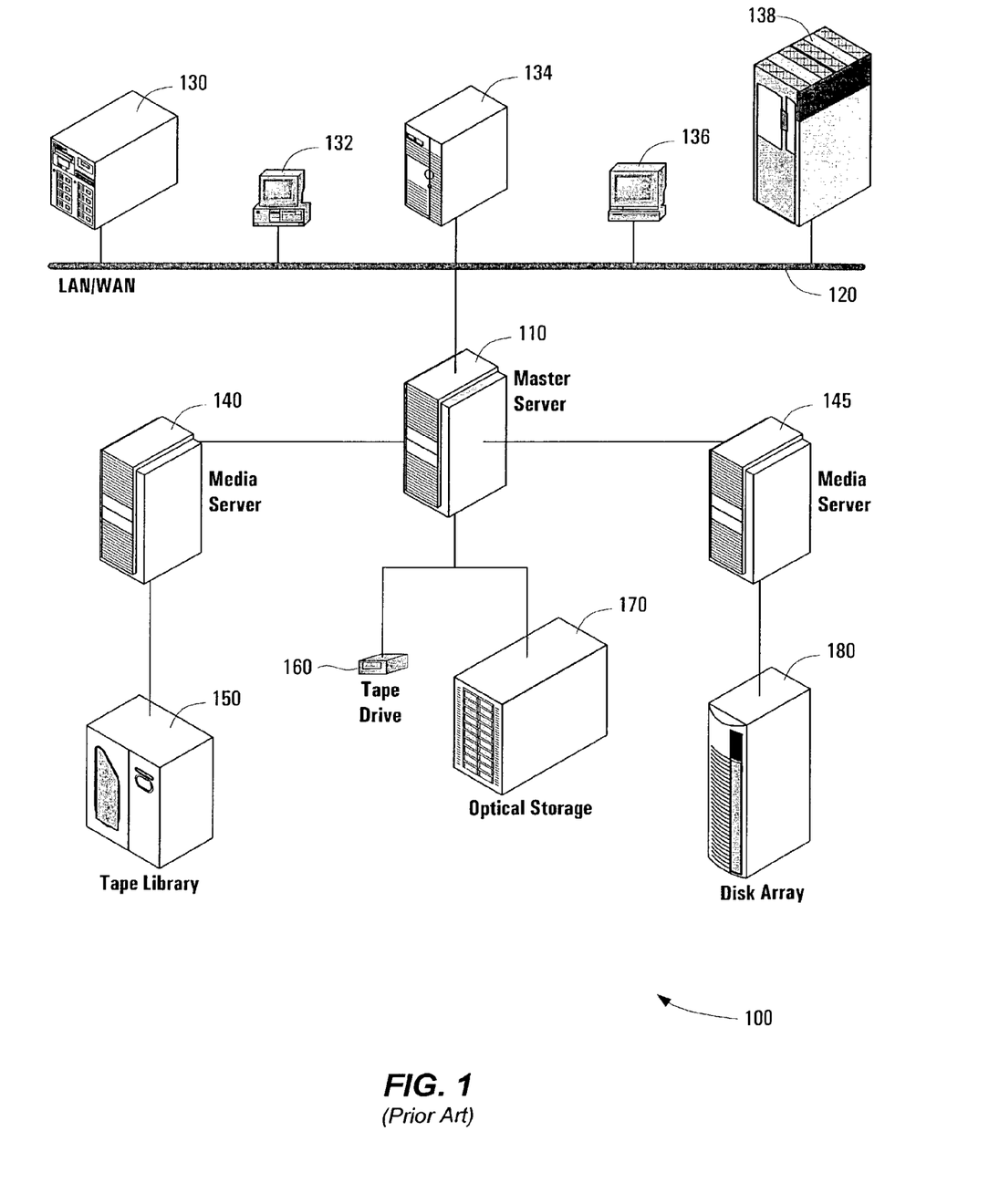
FIG. 1 is a simplified block diagram of a data protection system for use in a variety of computing environments.

FIG. 1 illustrates an example of a data protection system for use in a variety of computing environments, e.g., small business, enterprise, educational, and government computing environments. Such data protection systems typically provide functionality for one or more of: data backup, data recovery, data duplication and data archiving. Moreover, the data manipulated by such systems can include all manner of computer readable information including computer software, image files, text files, database data, and the like. Computing system 100 includes a number of computer systems such as servers 110, 130, 134, 138, 140, and 145 and workstations 132 and 136 interconnected by network 120 and/or directly connected with each other. Network 120 can implement any of a wide variety of well known computer networking schemes but is typically a local area network (LAN), an enterprise-wide intranet, or a wide area network (WAN) such as the Internet. Each of the computer systems typically include information such as system software, application software, application data, etc., that has some value to users of the computer systems and thus requires some level of data protection.

Information protection within computing system 100 is controlled and coordinated by software operating on master server 110. The software operating on master server 110 is the "brains" for all data protection activities and provides, for example, scheduling and tracking of client computer system backups and restorations, management of data storage media, and convenient centralized management of all backup and restoration activities. In the example illustrated in FIG. 1, master server 110 can also have one or more storage devices, e.g., tape drive 160 and optical storage device 170, attached directly to the server or through network 120 for backing up and restoring data from multiple clients. In support of such a data protection system, each of the data protection system clients (e.g., servers 130, 134, 138, and workstations 132 and 136) of master server 110 typically include backup and restore client software or agents. Such agents typically receive instructions from master server 110 and handle the extraction and placement of data for the particular client computer system. Together, master server 110 and the data protection agent operating on a client computer system can backup and restore files, directories, raw partitions, and databases on client systems. Such data protection software can also be used to archive and restore logical database data.

FIG. 1 also illustrates other possible components of computing system 100. In general, media servers 140 and 145 operate under control of master server 110. Data protection administrative functions are performed centrally from master server 110, and master server 110 also controls backup scheduling for each media server 140 and 145. Each of the media servers performs actual data movement operations (e.g., backup operations and restore operations) under direction from the master server, and the data remains local to the media servers and their respective storage devices. Thus, media server 140 is coupled to tape library 150, and media server 145 is coupled to disk array 180.

Variations on this basic scheme are well known in the art. For example, a master server and its associated media servers can be referred to collectively as a storage domain, and large networks may have more than one storage domain. A media server can share a storage device such as a robotic tape library with other devices such as its master server or another media server. Master servers, media servers, and storage devices can be directly connected to one another, connected to each other using a conventional network, or connected to each other using a specialized network such as a storage area network (SAN). Still other devices, such as SAN switches, SAN routers, storage appliances, and/or data movers (e.g., third-party copying devices) can be used in computing system 100. Finally, it should be noted that a master server can also operate as a media server and that master and media servers can treat themselves as data protection clients, e.g., they can backup and restore data from or to themselves.

Although one of the benefits of using a data protection system like that illustrated in FIG. 1 is the centralized control and administration of a relatively large computing system, the complexity of such systems can quickly outstrip traditional tools used to visualize and manipulate the components and activities of the system. For example, many prior art data protection systems utilize detailed lists describing pending and/or active jobs as well as system devices and there properties. While such lists can provide a great deal of information, it may be difficult for a user to navigate such lists to find the information they desire, particularly in large computing systems. Moreover, using such data lists, it may be very difficult to understand or appreciate the interrelations of system devices and the range of activities occurring throughout the system at a given point in time.

Accordingly, it is desirable to have flexible and feature-rich tools for visualization and management of data protection systems.

SUMMARY OF THE INVENTION

It has been discovered that systems, methods, apparatus and software can provide visualization of the topology of a data protection system. Various devices making up the data protection system are displayed using graphical user interface elements such as icons. The display of the devices making up the data protection system illustrates the topology of the data protection system, connections among various system devices, device status information, device activity information, and/or device configuration information.

Accordingly, one aspect of the present invention provides a method. Information about each of a plurality of data protection system devices is received. The information includes at least one of device status information, device activity information, and device configuration information. A plurality of graphical user interface (GUI) elements is displayed. At least one of the plurality of GUI elements represents at least one of the plurality of data protection system devices. The displaying presents an indication of a data protection system topology. User actuation of the at least one of the plurality of GUI elements is responded to by at least one of performing a command, displaying an additional GUI element, and displaying information about the at least one of the plurality of data protection system devices.

In another aspect of the present invention, a system includes a data protection manager configured to at least one of generate a data stream to be backed up and direct a data stream to a storage device. An administration interface is coupled to the data protection module and operable to provide a user access to functionality of the data protection manager. The system also includes a topology tool configured to display, using the administration interface, a plurality of graphical user interface (GUI) elements, wherein at least one of the plurality of GUI elements represents at least one of a plurality of data protection system devices. The topology tool is also configured to respond to user actuation of the at least one of the plurality of GUI elements by at least one of performing a command, displaying an additional GUI element, and displaying information about the at least one of the plurality of data protection system devices.

Yet another aspect of the present invention provides an apparatus including a means for receiving information about each of a plurality of data protection system devices, a means for displaying a plurality of graphical user interface (GUI) elements, and a means for responding to user actuation of the at least one of the plurality of GUI elements. The information includes at least one of device status information, device activity information, and device configuration information. At least one of the plurality of GUI elements represents at least one of the plurality of data protection system devices, and the means for displaying presents an indication of a data protection system topology. The means for responding to user actuation of the at least one of the plurality of GUI elements responds by at least one of performing a command, displaying an additional GUI element, and displaying information about the at least one of the plurality of data protection system devices.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 2:
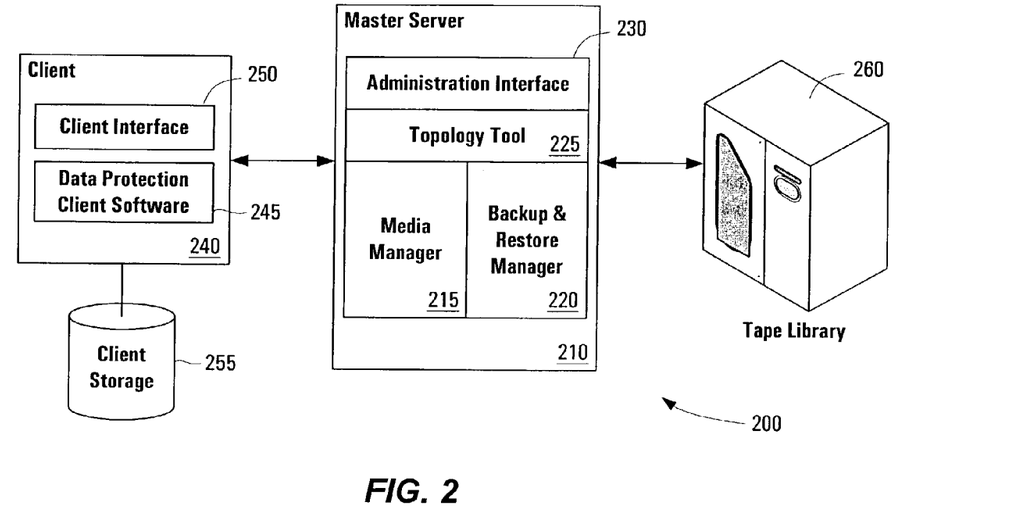
FIG. 2 is a simplified block diagram of a portion of a data protection system for use in a variety of computing environments.

FIG. 2 is a simplified block diagram of a portion of a data protection system for use in a variety of computing environments. The data protection system components shown include master server 210, a client computer system 240 and a storage device, in this case tape library 260. In this simplified example, master server 210 handles data movement between client 240 tape library 260, and thus there is no separate media server illustrated.

Master server 210 includes several software components: media manager 215, backup & restore manager 220, data protection system topology visualization tool ("topology tool") 225, and administration interface 230. As illustrated in FIG. 2, each of media manager 215, backup & restore manager 220, topology tool 225, and administration interface 230 are shown as separate software modules. These modules, and indeed any of the software modules described herein, can be combined in various ways to form single software modules, implemented on separate computer systems, executed as separate threads on a single computer system, etc. For example, since the use of topology visualization functionality is typically accessed as part of the normal system administration process, administration interface 230 and topology tool 225 can be part of the same program. Moreover other functionality, such as media server functionality, can be included in the software executing on master server 210. Other examples of software operating on master server 210 as well as software such as client interface 250 and data protection client software 245, can be found in the VERITAS NetBackup™ family of products provided by VERITAS Software Corporation. Many of the examples illustrated in FIGS. 3-6 are based on implementations present in the VERITAS NetBackup™ family of products. However, the mere fact that such examples come from the VERITAS NetBackup™ family of products should not be construed as limiting the scope of the invention.

Figure 3:
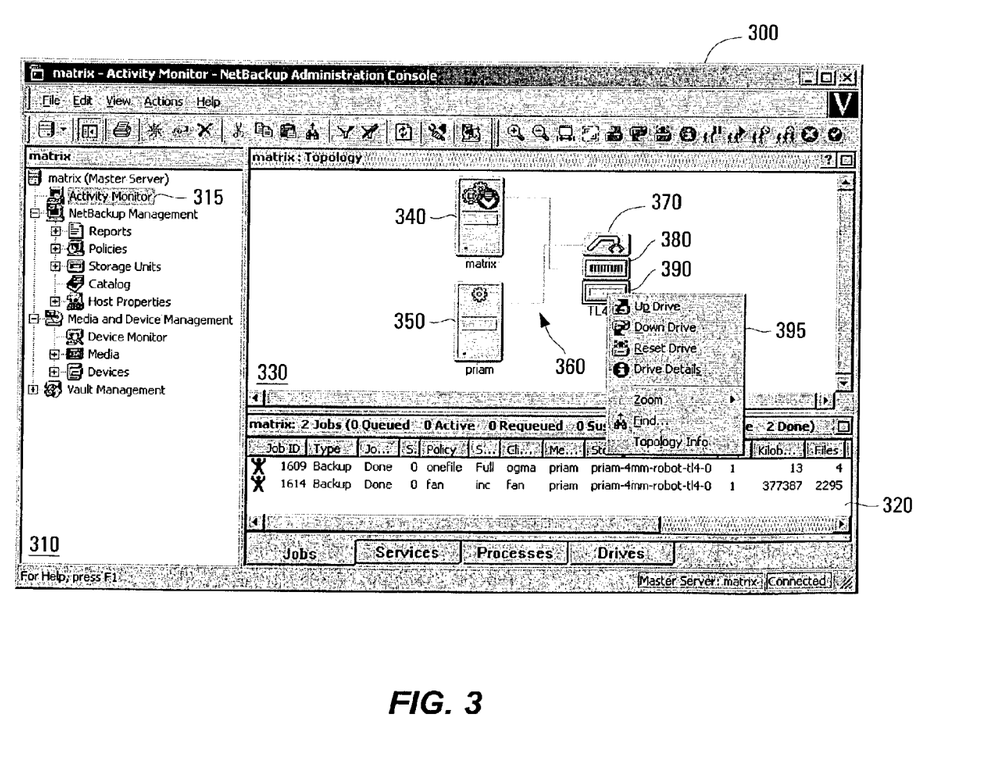
FIG. 3 illustrates an example of a data protection system topology visualization and management tool.

Administration interface 230 provides an entry point into the administration categories of the data protection system. FIG. 3, as will be discussed in greater detail below, illustrates an example of an administration interface. System administration can be separated into a number of different areas, including for example media and device management and protection activity management. Using protection activity management functionality, an administrator can run reports on the system, create backup policies and storage units, manage a catalog of stored data, and configure host properties for master servers, media servers or clients. In addition to using administration interface 230, such tasks are typically performed using backup & restore manager 220. Using media and device management functionality, one can manage and monitor storage devices and various storage media. Such tasks are typically performed using media manager 215, again typically in conjunction with administration interface 230. Using these tools, the master server in a storage domain serves as a single point of administration for all backup operations in the storage domain. Administrators configure backup policies, manage media and media pools, and configure local and remote devices in the storage domain from the master server without the need to log on to or directly access any media servers. In addition to retaining backup schedules and other configuration information, the master server contains the backup catalog for the entire storage domain. Users can browse this catalog to locate and restore files.

The functionality embodied in topology tool 225 can be used by an administrator of the data protection system to (1) monitor progress and status of data protection jobs and activities; and (2) add, configure, and manage devices and media used by the data protection system. To this end, topology tool 225 presents a graphical representation of the data protection system topology. The graphical representation of the data protection system topology is presented in the context of an administration interface, e.g., with other forms and types of relevant information and interactive elements. Moreover, the graphical representation of the data protection system topology is implemented using graphical user interface techniques familiar to most computer system users. The combination of an accurate graphical representation of the data protection system topology with interactive features allows a user to efficiently absorb relevant information and interact with the complete data protection system.

Client computer system 240, whether a server, workstation, or some other device, operates data protection client software 245 in conjunction with the various data protection software present in master server 210. In a typical implementation, data protection client software 245 is responsible for gathering data that is the subject of some data protection activity from client storage 255 and forwarding it to master server 210 (e.g., a backup job for which master server 210 is also operating as a media server). Master server 210 coordinates delivery of the data to tape library 260. Other data protection operations, i.e., data restore, data duplication, and data archiving, can be implemented in a similar fashion.

FIG. 3 illustrates an example of a data protection system topology visualization and management tool. Data protection system software 300 presents and administration interface using graphical user interface (GUI) elements familiar to one of ordinary skill in the art, and including pull-down menus, windows, sub-windows or "panes", root/tree structure lists, tabs, toolbars with buttons, scrollbars, and the like. In this example, pane 310 presents an expandable tree of objects to view that are accessible by a user of data protection system software 300. As illustrated, these various functions and operations correspond to a particular master server, in this case a master server named "matrix". In one implementation, the objects presented in pane 310 apply only to the corresponding master server, but other master servers can be selected using a change server command from data protection software 300. Pane 310 shows that a particular object has been selected, i.e., "Activity Monitor" 315. The activity monitor is typically used by a data protection system administrator to monitor and control data protection jobs, services, processes, and devices.

To display activity information, panes 320 and 330 are used. Pane 320 presents lists of information about some aspect of the data protection system. In this case, the information illustrated corresponds to various jobs running on some portion of the data protection system. Pane 330 also presents activity information, but in this case pane 330 makes use of topology tool 225 to present some or all of the topology of the data protection system, including the devices in the system, their relative connections and interactions, device status information, activity information, and device configuration information. Thus, the topology view presented in pane 330 can display the state and configuration of the entire data protection system being administered. The topology view shows master servers (340), media servers (350), clients (not shown in FIG. 3), and storage unit devices (370, 380, 390). The topology view can also display backup and restore activity, job failures, services that are down, and drive state status.

For example, master server icon (in this example a master server includes two gears and a media server has only one gear) 340 includes an additional status symbol (circle with downward pointing arrow) indicating that certain master server services are down. Media server icon 350 is shown with the corresponding media server's name and includes no additional activity or status symbols, thereby indicating that the media server is performing normally and that no activity is currently happening on the corresponding media server. Robotic device icon 370 represents some robotic device, such as those implemented in some tape library devices or optical storage devices, used to physically load and unload storage media from storage devices. Robotic device media icon 380 corresponds to the storage media used by the robotic device. Drive icon 390 represents a storage device drive.

The topology view also displays the physical and logical connections between devices. Connecting lines 360 appear between a device in use and the server using it. For example, the connecting lines appearing between media server icon 350 and robotic device icon 370 indicate that the media server "Priam" is controlling the robot. Likewise, the connecting lines appearing between master server icon 340 and storage media icon 380 indicate that the master server has control over the media. If a backup or restore operation is in progress, a connecting line appears between drive icon 390 and the server providing the data. Robotic devices and drives are represented as connected to a media server. Drives that are physically located in a robotic device are typically shown directly below the robotic device icon. Standalone drives can be represented by individual drive icons.

Selecting an object highlights the connecting lines from the object to other objects to which it is connected. For example, if an administrator clicks on a server, attached robots, media, and drives configured to the server are highlighted. Multiple objects of the same type can be selected by, for example, pressing a control key on the keyboard of the computer system running data protection system software 300 and selecting another object. In one embodiment, selection of unlike objects is not allowed.

Other GUI elements can be used in conjunction with the topology view to provide a user with added functionality. For example, popup menu 395 can be activated by right-clicking an icon presented in topology pane 330. In the case illustrated in FIG. 3, the results of performing such an operation on drive icon 390 are shown. Here, popup menu 395 presents one or more menu options. These menu options can be specific to and/or associated with the device represented by the icon selected in this manner. Menu options "Up Drive", "Down Drive", "Reset Drive" and "Drive Details" are shown. The "Up Drive" command sets the drive to "up" in an automatic volume recognition (AVR) mode. This is a normal and typically default mode for drives. In AVR mode, a robotic device automatically retrieves, mounts, unmounts, and stores volumes. Manual intervention is typically needed only when a request causes an error. The "Down Drive" command sets the selected drive to the "down" mode so that it is not available to other software in the data protection system, e.g., media management software. In this mode, drives are not under control of media management software and typically cannot be assigned to requests. The "Reset Drive" command resets the specified drive, terminating the drive assignment and taking control away from the assigned user. "Drive Details" provides the user with detailed information about the drive including, for example, device name, device type, device configuration information, etc.

Other more general commands are also available from popup menu 395. The "Zoom" command allows a user of data protection system software 300 to "zoom in" to or "zoom out" off the topology view. Such a command is particularly useful when the size and complexity of the data protection system leads to a topology view that is larger than the desired pane or window size. Specific devices can be found in the topology using the "Find" command. General topology information can be retrieved using the "Topology Info" command. The various commands shown in popup menu 395 are merely exemplary, and a variety of other commands can be included in such menus as will be understood to one of ordinary skill in the art. Additionally, use of one or more commands from a popup menu such as popup menu 395, selection or activation of any of the GUI elements displayed in pane 330, or interaction with any portion of the topology view can cause other information to be displayed. For example, selecting one of the various icons 340, 350, 370, 380, and 390 can cause related information to be displayed in pane 320.

In most cases, a topology tool will utilize information about the data protection system that is already available from the main software components of the data protection system software. In other example, certain features implemented by the topology tool can require additional information and thus cause certain information request to be made to one or more devices present in the data protection system. Additionally, FIG. 3 shows topology tool functionality (as presented in pane 330) as an integrated part of data protection software 300 and in use by a particular sub-function of the software (Activity Monitor 315). It should be noted that many different sub-functions of data protection software 300 can make use of the topology tool. Moreover, the actual implementation of data protection software 300 can include a single topology tool module for use by many different sub-functions, or it can include multiple implementations of the topology tool where each implementation is tailored to the needs of the corresponding sub-function of data protection software 300. Such implementation variations are within the skill of one of ordinary skill in the art.

Figure 4:
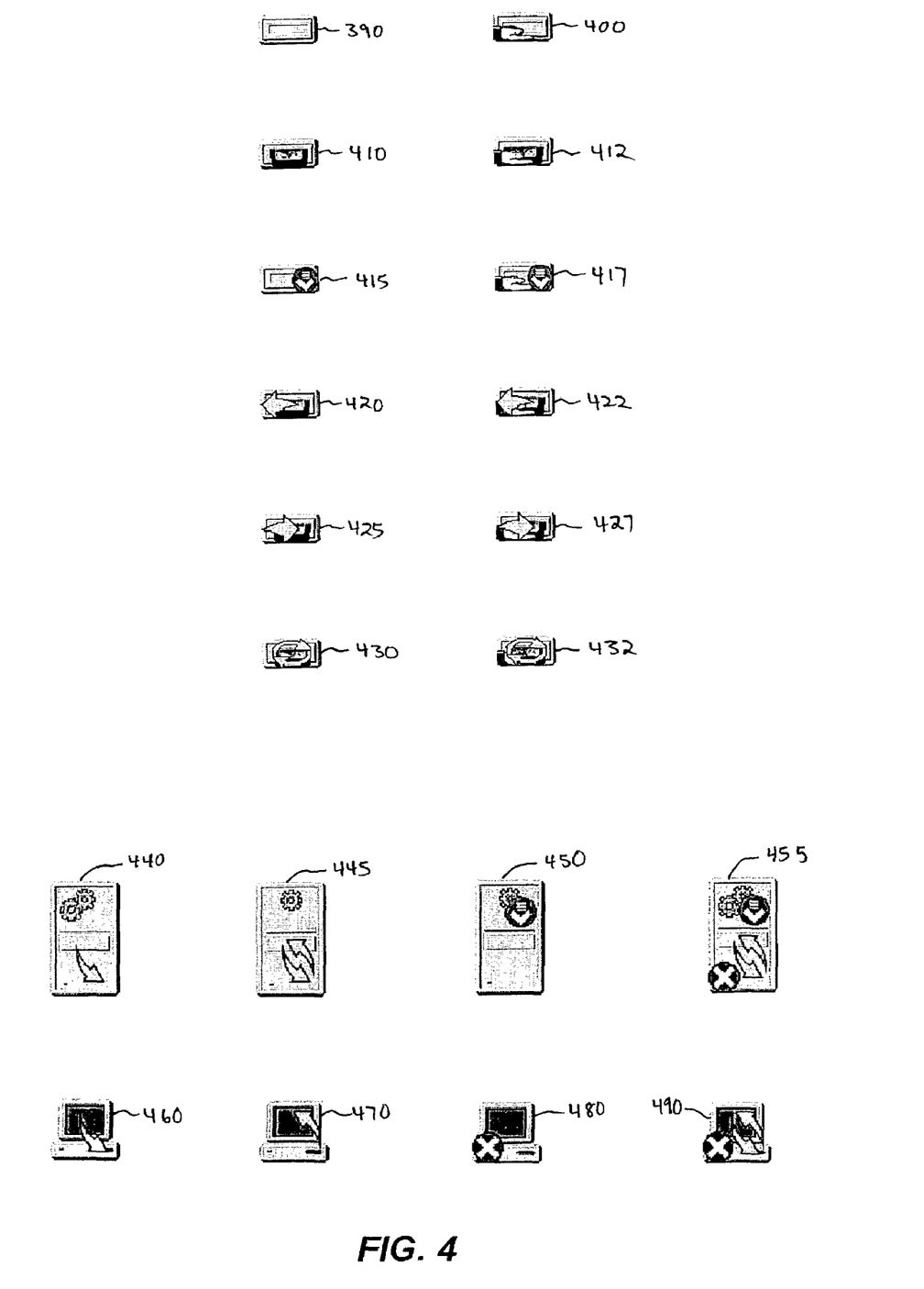
FIG. 4 illustrates examples of user-interface elements that can be used in the data protection system topology visualization and management tool of FIG. 3.

FIG. 4 illustrates examples of GUI elements that can be used in the data protection system topology visualization and management tool of FIG. 3. In addition to the device icon and device/status/activity icon examples of FIG. 3, FIG. 4 illustrates some of the many different possible icons for use in conjunction with the topology tool. Drive icon 390 is the basis for a shared drive icon 400. In general, such modified icons like shared drive icon 400 can be formed as a single icon, or can be displayed as a combination of two separate icons, e.g., a drive icon 390 and a separate "shared" icon superimposed on the drive icon. Such variations in implementation are within the skill of those having ordinary skill in the art. As shown, icons 410, 415, 420, 425, and 430 each have a corresponding shared icon 412, 417, 422, 427, and 432 respectively. Icon 410 represents a drive that is loaded with a corresponding type of media, e.g., a tape, optical disk, or some other removable storage media. Icon 415 shows a drive that is down, i.e., it is not available for use in the system for some reason. Icon 420 represents a drive that is loaded with a corresponding type of media and is currently being read from by some other device. Similarly, icon 425 represents a drive that is loaded with a corresponding type of media and is currently being written to by some other device. Icon 430 shows a drive that is loaded with a corresponding type of media and is currently active, e.g., it might be reading, writing, or performing some other operation such as a tape rewind or advance.

Icon 440 represents a master server that is itself being backed-up, i.e., data is flowing out of the master server. Icon 445 shows a media server that is engaging in both a backup and a restore operation. Icon 450 represents a media server with one or more services down. Multiple states can also be shown at the same time. Icon 455 shows a master server performing both a backup and a restore operation, one or more services are down, and a job failure has occurred. Icon 460 is an example of a data protection system client that is being backed up. Icon 470 shows a client running a restore operation. Icon 480 represents a client computer system with a failed job. Icon 490 indicates that there is an active backup job, an active restore job, and a previous job failure has occurred.

The various icons shown in FIGS. 3 and 4 are merely illustrative of the many possible types of icons that can be used in conjunction with the topology tool. Numerous other types of devices, activities, and states can be represented by other icons or combinations of icons. The various activity or status symbols shown with one type of device icon can, in general, be used with any other device icon and multiple symbols and/or icons can be combined as needed. Moreover, additional GUI techniques can be used in conjunction with these icons. For example, GUI highlighting techniques can be used to indicate the selection of a particular icon or that some attention is needed. Icons can be shaded to indicate some general status such as partial configuration. In general, any graphical user interface technique can used in conjunction with the topology tool to convey information to a user of the data protection software.

Figure 5:
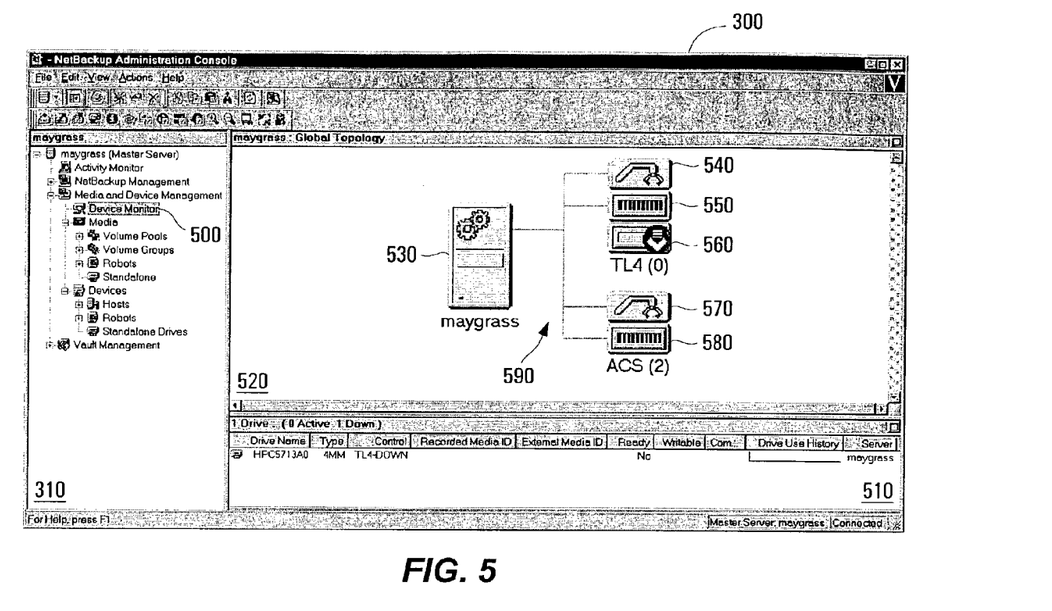
FIG. 5 illustrates another example of a data protection system topology visualization and management tool.

FIG. 5 illustrates another example of a data protection system topology visualization and management tool. In the example of FIG. 5, the topology tool is used in conjunction with another function of data protection software 300, i.e., "Device Monitor" functionality 500. In this example, and that of FIG. 6, the topology tool is used to augment services provided by portions of data protection software 300 to manage the devices and media that are used to store the protected data. In addition to previously described tree pane 310, two panes are initially displayed when the Device Monitor is activated: global device topology pane 520 and drive information pane 510.

The topology pane 520 shows the state of all devices present in the data protection system In one embodiment, information about these devices is taken from a global database. The topology shown in pane 520 typically differs from the activity monitor described above in connection with FIG. 3 in that it is a device centric view. Pane 520 may show multiple servers that are sharing the same devices. A description bar is typically displayed at the top of pane 520 indicating the nature of the topology view displayed. Other data protection system software functionality (not illustrated) allows for the customization of the view displayed in pane 520.

Connections in the topology indicate physical and logical connections of the devices, and are described above in conjunction with FIG. 3. Drive to device host (e.g., master server or media server) connections are typically shown only if the drive is being used for a request and the drive is in use by data protection system software 300. So, for example, master server 530 is shown connected to robotic device 540 and its associated media 550. A drive 560 used by robotic device 540 is also illustrated, but drive 560 is shown as being down. Master server 530 is also shown connected to robotic device 570 and its associated media 580.

As previously noted, activities performed on pane 520, e.g., manipulation of GUI elements in pane 520 can cause different information to be displayed in pane 510. Pane 510 shows the status of the drives that the media and device manager controls on the corresponding master server. Information in the drive status pane 510 is taken from the global device database. Thus, in one embodiment, by selecting objects in topology pane 520 a user can filter the contents of the lists in the drives status pane 510. Such an action can also cause corresponding connection lines in the topology to be highlighted. Multiple objects can be selected or de-selected as previously described. Additionally, popup menus can be used to provide easy access to general and device specific commands.

Figure 6:
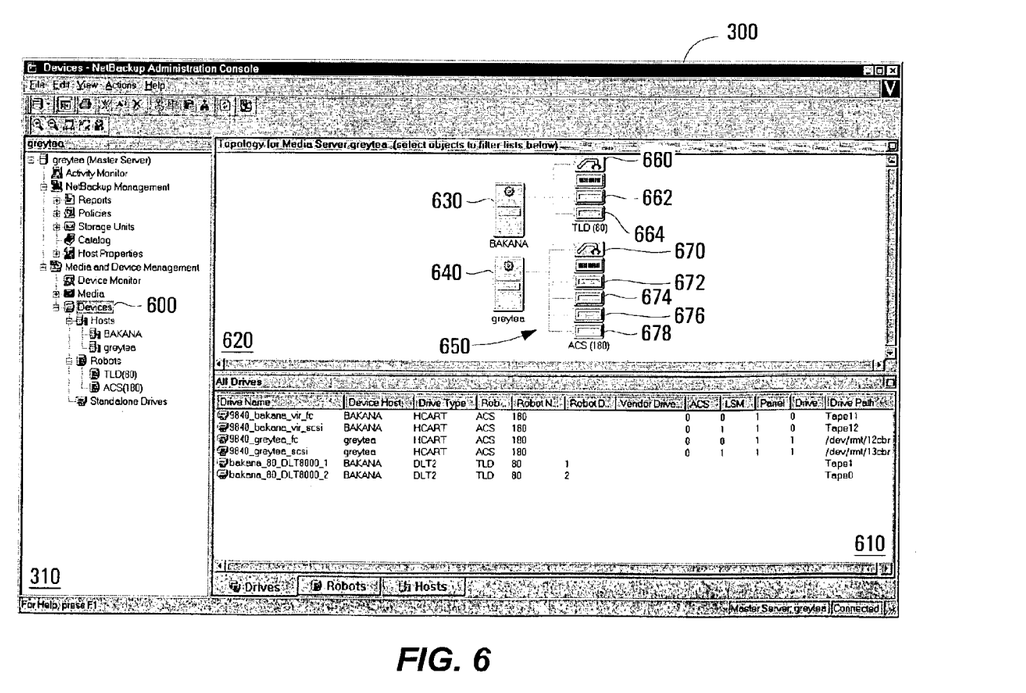
FIG. 6 illustrates another example of a data protection system topology visualization and management tool.

FIG. 6 illustrates still another example of a data protection system topology visualization and management tool. In the example of FIG. 6, the topology tool is used in conjunction with another function of data protection software 300, i.e., "Devices" functionality 600. In this example, the topology tool is used to augment services of data protection software 300 to provide the tools required to add, configure, and manage the devices used by a media manager. The topology view pane 620 shows how devices are configured to the master server being administrated by showing images of servers and devices. As in previous examples, the topology information can be taken from a global device database and is displayed in this pane. Device display and connections in pane 620 are implemented in a manner similar to that described above in connection with FIGS. 3 and 5.

So, for example, media server 630 is shown connected to robotic device 660 and its associated drives 662 and 664. Media server is also connected to robotic device 670 and its associated drives 672 and 674. Media server 640 is connected to robotic device 670 and also to that robotic device's associated drives 676 and 678. Selecting an object will highlight the connecting lines from the object to all other objects to which it is connected. Thus, clicking on a drive will highlight the connection to the server it is attached. Clicking on a shared drive will highlight connections to all servers that are configured to use the drive. Clicking on a server will highlight connections to all robots, media, and drives that are connected or configured to the server. Selecting objects in topology pane 620 is also one of the methods to filter the contents of the lists shown in devices pane 610.

It should be noted that although many of the preceding examples illustrate use of a data protection system topology tool in the context of master-server/media-server based data protection system, the data protection system topology tool can generally be used in conjunction with any distributed data protection system.

The tools and methods described in this application are typically implemented (in whole or in part) as one or more software programs for a computer system encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Although the examples described typically illustrate conventional application software, other examples might include web-based applications. In general, any type of software implementation suitable for client/server computing environment can be used to implement the present invention.

Figure 7:
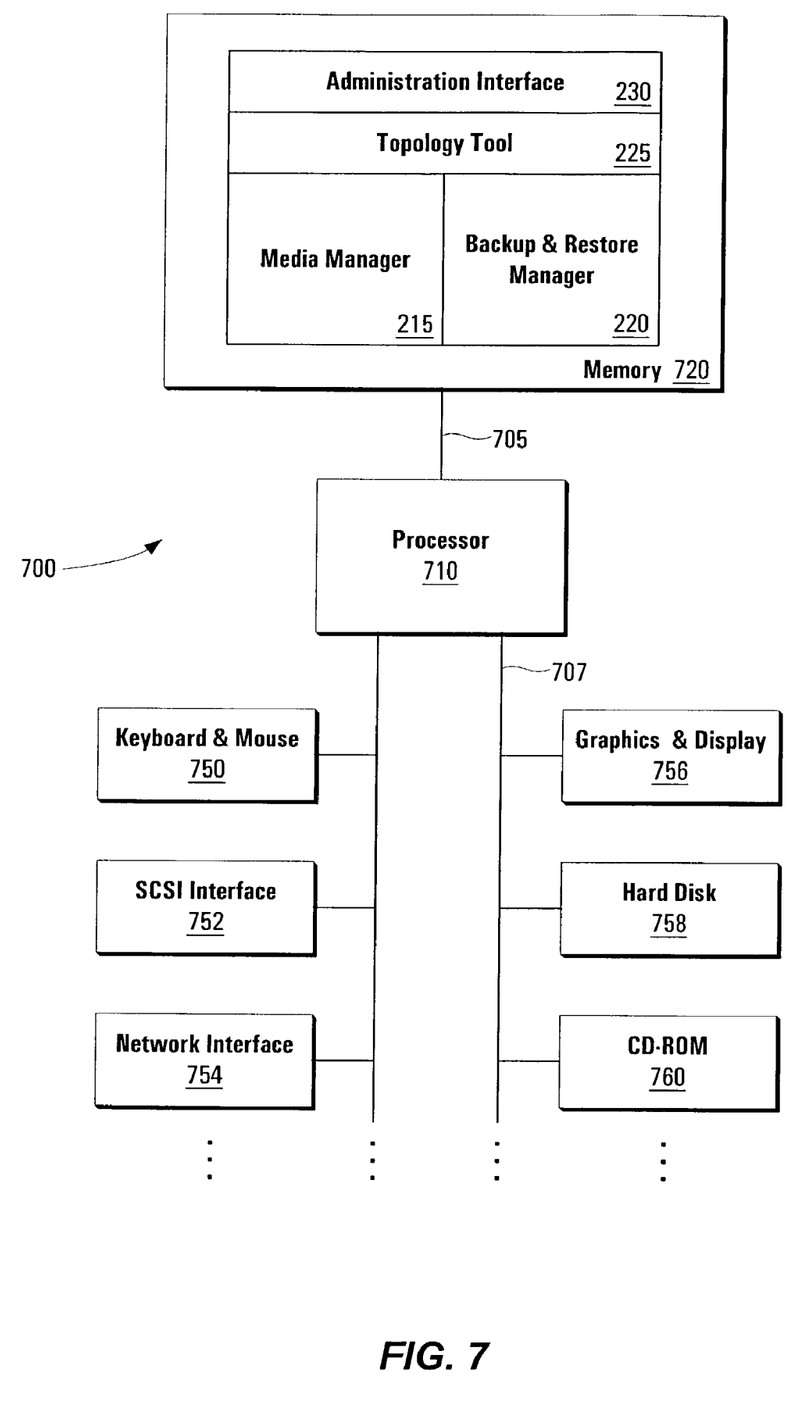
FIG. 7 is a simplified block diagram of a computer system for implementing the techniques of the present invention.

FIG. 7 illustrates a block diagram of a computer system 700 for implementing the techniques of the present invention. For example, computer system 700 can be an embodiment of one of the previously described servers or client computer systems. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., software 215, 220, 225, and 230. Memory 720 is also used for storing temporary variables or other intermediate information during the execution of instructions by the processor 710.

Those having ordinary skill in the art will readily recognize that the techniques and methods discussed below can be implemented in software using a variety of computer languages, including, for example, computer languages such as C, C++, C#, and Java. If implemented in a web-based client/server environment, computer languages such as HTML, XML, JavaScript, VBScript, JScript, PHP, Perl; development environments/tools such as Active Server Pages (ASP), JavaServer Pages (JSP), and ColdFusion; and interface tools such as the Common Gateway Interface (CGI) can also be used. Additionally, software 215, 220, 225, and 230 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard & mouse 750, SCSI interface 752, network interface 754, graphics & display 756, hard disk 758, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A system comprising:
    data protection manager configured to at least one of:
        generate a data stream for backed up and
        direct a data stream to a storage device;
    an administration interface coupled to the data protection manager and to provide a user access to functionality of the data protection manager;
    a topology tool configured to:
        display, using the administration interface, a plurality of graphical user interface (GUI) elements, wherein at least one of the plurality of GUI elements represents at least one of a plurality of data protection system devices including a first protection device that stores backup data; and respond to user actuation of the at least one of the plurality of GUI elements by at least one of performing a command, displaying an additional GUI element, and displaying information about the at least one of the plurality of data protection system devices;

a memory; and a processor coupled to the memory, wherein at least one of the data protection manager, the administration interface, and the topology tool are encoded as instructions stored in the memory and executable on the processor;

wherein the topology tool is further configured to receive information about each of the plurality of data protection system devices, the information comprising device status information, device activity information, and device configuration information;

wherein the device status information further comprises job failure information, service down information, and media loaded information.

2. A method comprising:

providing, by an administration interface, a user access to functionality of a data protection manager;

receiving information about each of a plurality of data protection system devices, including a first protection device that stores data copied from a first storage device during a backup operation, the information comprising device status information, device activity information and device configuration information; the device status information comprises service down information job failure information and media loaded information; displaying a plurality of graphical user interface (GUI) elements, the displaying performed by a topology tool using the administration interface, at least one of the plurality of GUI elements represents at least one of the plurality of data protection system devices; and the displaying presents an indication of a data protection system topology; and responding, by the topology tool, to the user actuation of the at least one of the plurality of GUI elements by at least one of performing a command, displaying an additional GUI element, and displaying information about the at least one of the plurality of data protection system devices.

3. The method of claim 2 wherein the plurality of data protection system devices includes at least one of a master server computer system, a media server computer system, and a robotic device.

4. The method of claim 2 wherein the information further comprises at least one of read activity information, write activity information, and data protection activity performance information.

5. The method of claim 2 wherein the information further comprises at least one of shared device information and device connection information.

6. The method of claim 2 wherein the plurality of GUI elements further comprises at least one of an icon, a pull-down menu, a window, a window pane, a tree structure list, a button, a toolbar, a scrollbar, and a popup menu.

7. The method of claim 2 wherein the displaying further comprises:

positioning the at least one of the plurality of GUI elements representing at least one of the plurality of data protection system devices with respect to another one of the plurality of GUI elements representing another one of the plurality of data protection system devices; and displaying at least one connecting line between the at least one of the plurality of GUI elements and the another one of the plurality of GUI elements.

8. The method of claim 2 wherein the user actuation of the at least one of the plurality of GUI elements further comprises at least one of clicking on the at least one of the plurality of GUI elements, dragging the at least one of the plurality of GUI elements, and selecting a menu option from the at least one of the plurality of GUI elements.

9. The method of claim 2 further comprising:

obtaining additional information corresponding to at least one of the plurality of data protection system devices in response to the user actuation of the at least one of the plurality of GUI elements.

10. An apparatus comprising:

means for providing, by an administration interface, a user access to functionality of a data protection manager;

means for receiving information about each of a plurality of data protection system devices, including a first protection device that stores data copied from a first storage device during a backup operation, device status information, device activity information, and device configuration information; the device status information comprises service down information, job failure information job failure information and media loaded information; means for displaying a plurality of graphical user interface (GUI) elements, the displaying supported by a topology tool using the administration interface, at least one of the plurality of GUI elements represents at least one of the plurality of data projection system devices; and the displaying presents an indication of a data protection system topology; and means for responding, utilizing the topology tool, to the user actuation of the at least one of the plurality of GUI elements by at least one of performing a command, displaying an additional GUI element, and displaying information about the at least one of the data protection system devices.

11. The apparatus of claim 10 further comprising:

a means for positioning the at least one of the plurality of GUI elements representing at least one of the plurality of data protection system devices with respect to another one of the plurality of GUI elements representing another one of the plurality of data protection system devices; and a means for displaying at least one connecting line between the at least one of the plurality of GUI elements and the another one of the plurality of GUI elements.

12. The apparatus of claim 10 further comprising:

a means for obtaining additional information corresponding to at least one of the plurality of data protection system devices in response to the user actuation of the at least one of the plurality of GUI elements.

* * * * *